Aug. 11, 1959     B. H. BUNN     2,898,847
TYING MACHINE

Filed Sept. 29, 1953     7 Sheets-Sheet 1

INVENTOR.
Benjamin H. Bunn
BY
Att'y

Aug. 11, 1959     B. H. BUNN     2,898,847
TYING MACHINE
Filed Sept. 29, 1953     7 Sheets-Sheet 5
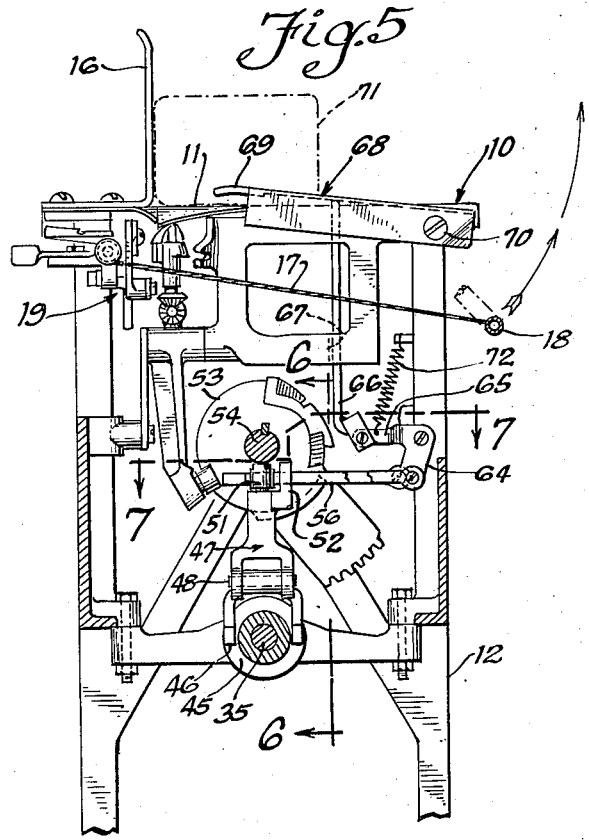
Fig. 5
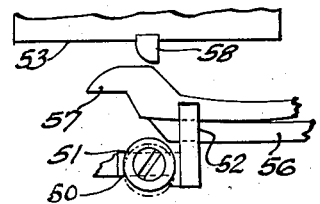
Fig. 8
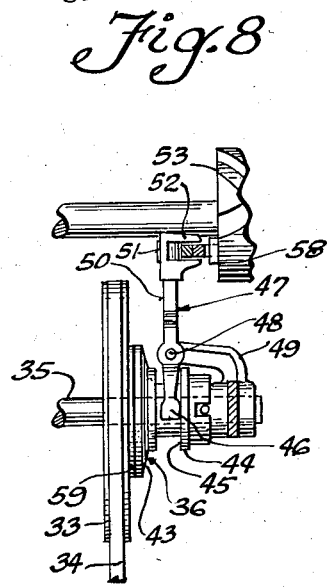
Fig. 6
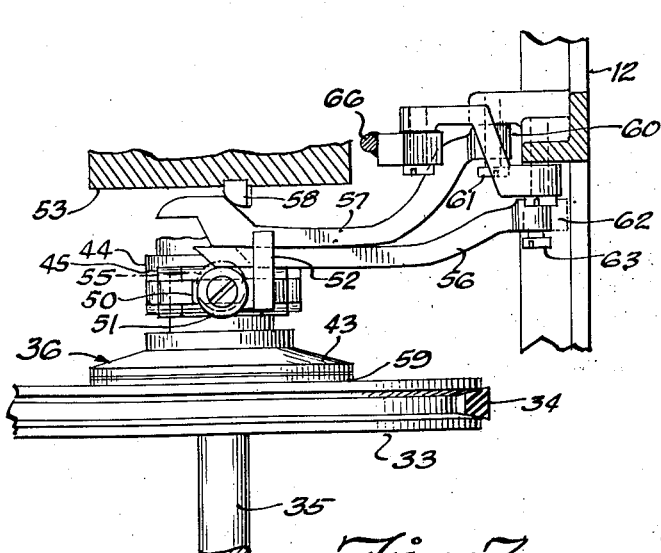
Fig. 7
INVENTOR.
Benjamin H. Bunn
BY 
Att'y

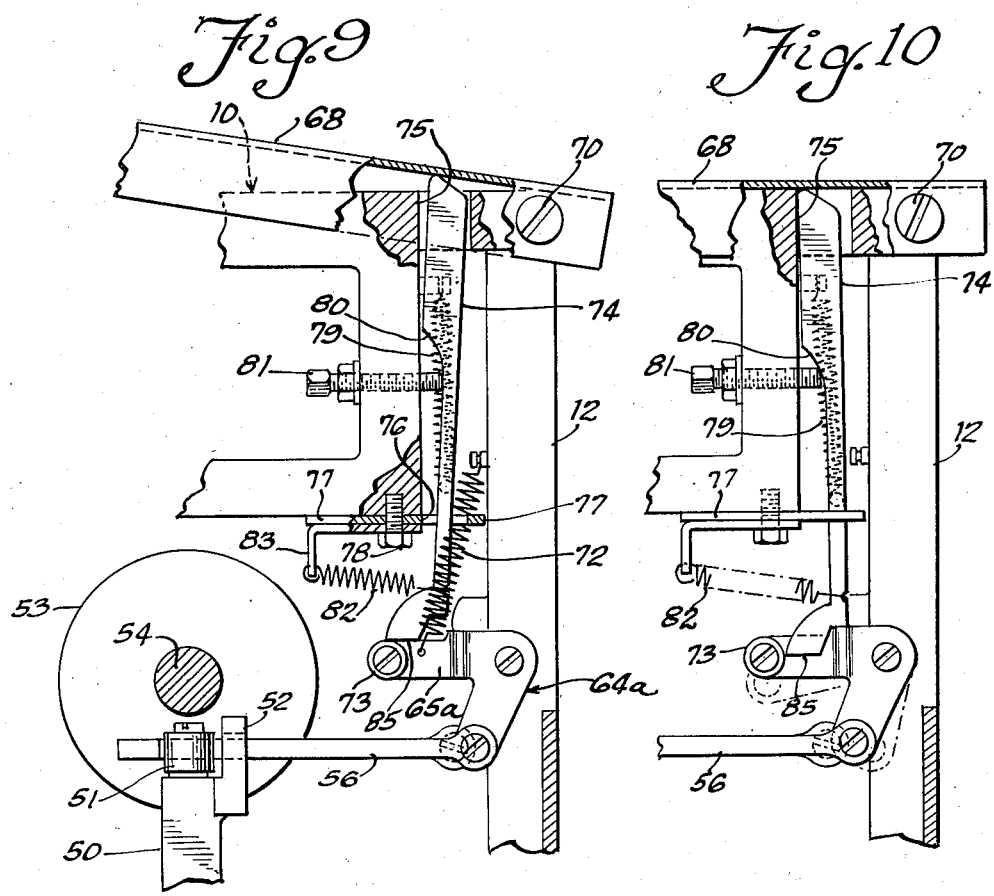
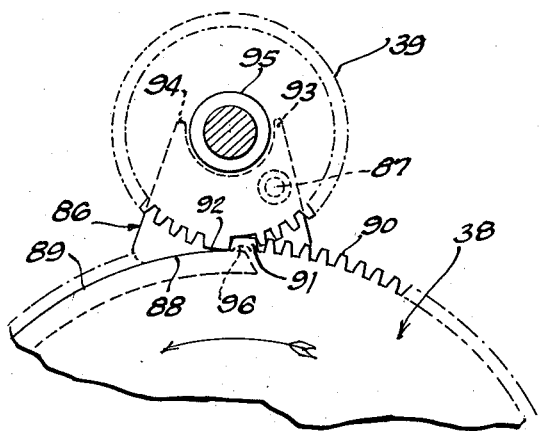

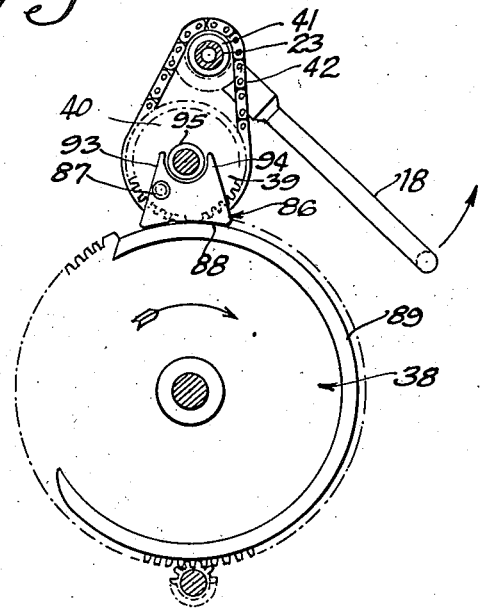
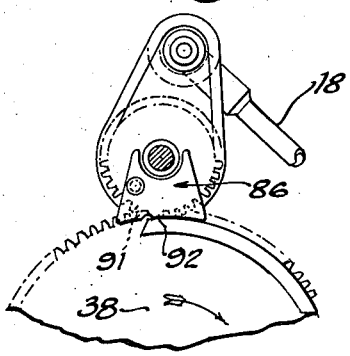
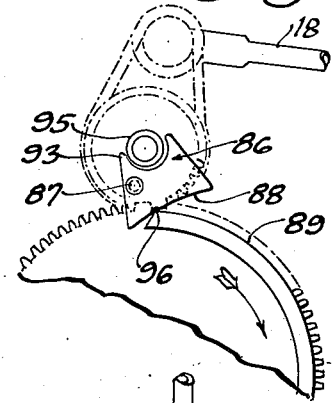
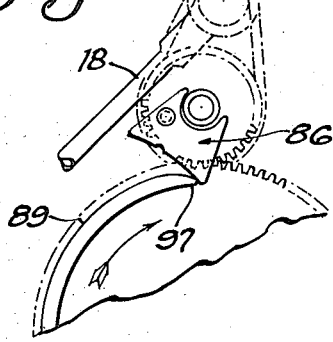
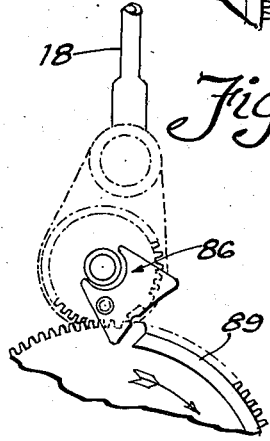
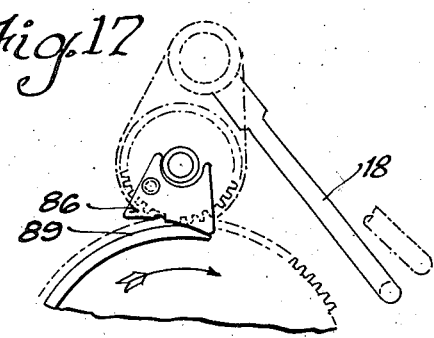
INVENTOR.
Benjamin H. Bunn United States Patent Office 2,898,847
Patented Aug. 11, 1959

2,898,847

TYING MACHINE

Benjamin H. Bunn, Chicago, Ill., assignor to B. H. Bunn Company, Chicago, Ill., a corporation of Illinois Application September 29, 1953, Serial No. 383,066

8 Claims. (Cl. 100—4)

This invention relates to tying machines for tying packages and is in the nature of an improvemnt upon the machine disclosed and claimed in my Patents No. 1,606,290, dated November 9, 1926, and No. 2,371,024, dated March 6, 1945.

The principal object of this invention is to improve the general operation of my prior tying machines and particularly to simplify the operation of certain portions of the machine, and to render other portions of the machine automatic and trouble-free in operation.

A more specific object of this invention is to provide a trip mechanism for initiating the operation of the machine, said trip mechanism being operated by the weight of a package being tied or by pressure applied to the top of the package when it is placed on the package support of the machine. In one form, the trip mechanism is automatically restored to normal after a predetermined cycle of operation whether or not the weight of the package or added force is removed from the trip lever of the mechanism, and the package is wrapped and tied but once during each such cycle of operation. In another form, the trip mechanism is not automatically restored to normal after a predetermined cycle of operation, so that the machine continues to operate and repeat the twine wrapping cycle as long as a package rests upon the actuating lever of the trip mechanism.

Another object of my invention has to do with the portion of the mechanism of my prior machine which caused the tying apparatus to stop at a particular point in its cycle, and particularly aims to provide such a stopping mechanism which will reduce wear of the associated parts and will not require the maintenance of close tolerances in the construction of the machine.

My invention has for another object the provision of a friction brake mechanism for the rotating twine arm of the machine, which mechanism decelerates the arm before it reaches its rest position and eliminates any vibration which might be produced in the arm and transmitted therefrom to other operating parts of the machine.

As another object of this invention I have provided a positive stop mechanism for the twine arm of the machine and a friction brake mechanism, also operative upon the arm, and adapted to decelerate the arm to a smooth stop but providing no resistance to a resumption of rotation of the arm.

Another object of this invention is to provide a twine guide which will allow lumped or twisted twine to pass through without having the guide become fouled and without having the twine leave the guide.

These and other objects of this invention will become apparent from the following detailed description when taken together with the accompanying drawings, in which—

Fig. 3A is an enlarged fragmentary sectional view of a friction brake which comprises a part of the disclosed machine;

Fig. 5 is a fragmentary rear sectional view of the machine which illustrates the trip mechanism thereof;

Fig. 6 is a fragmentary sectional view taken along a line 6—6 of Fig. 5 and showing the clutch operating mechanism for the machine;

Fig. 7 is an enlarged sectional view taken along a line 7—7 of Fig. 5 and showing the clutch operating linkage in one condition of operation;

Fig. 8 is a fragmentary sectional view similar to Fig. 7 and showing the clutch operating linkage in another condition of operation;

Figs. 9 and 10 are enlarged fragmentary sectional views showing an automatic trip mechanism for the clutch under two conditions of operation;

Fig. 11 is a rear view of a portion of a mechanism for performing a holding operation upon the twine arm of the machine; and Figs. 12 to 17, inclusive, show the mechanism for performing a holding operation on a twine arm in various states of its operation.

Many portions of the tying machine herein disclosed are either similar to or identical with the corresponding portions of the tying machines disclosed in my aforementioned prior Patents Nos. 1,606,290 and 2,371,024. To simplify the description of the present invention, therefore, those portions which are described in the aforesaid patents will only be described herein in sufficient detail to provide an understanding of the structure and operation of the machine in its adaptation to this invention.

Figure 1:
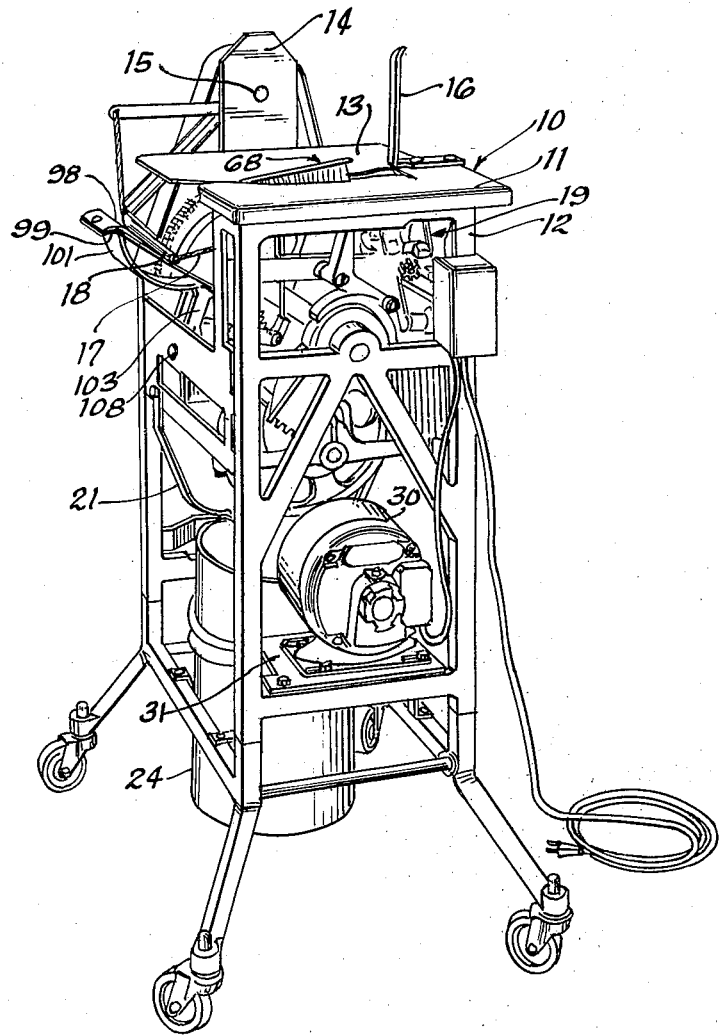
Fig. 1 is a perspective view taken from in front and to one side of a complete tying machine incorporating the improvements of this invention.
Figure 2:
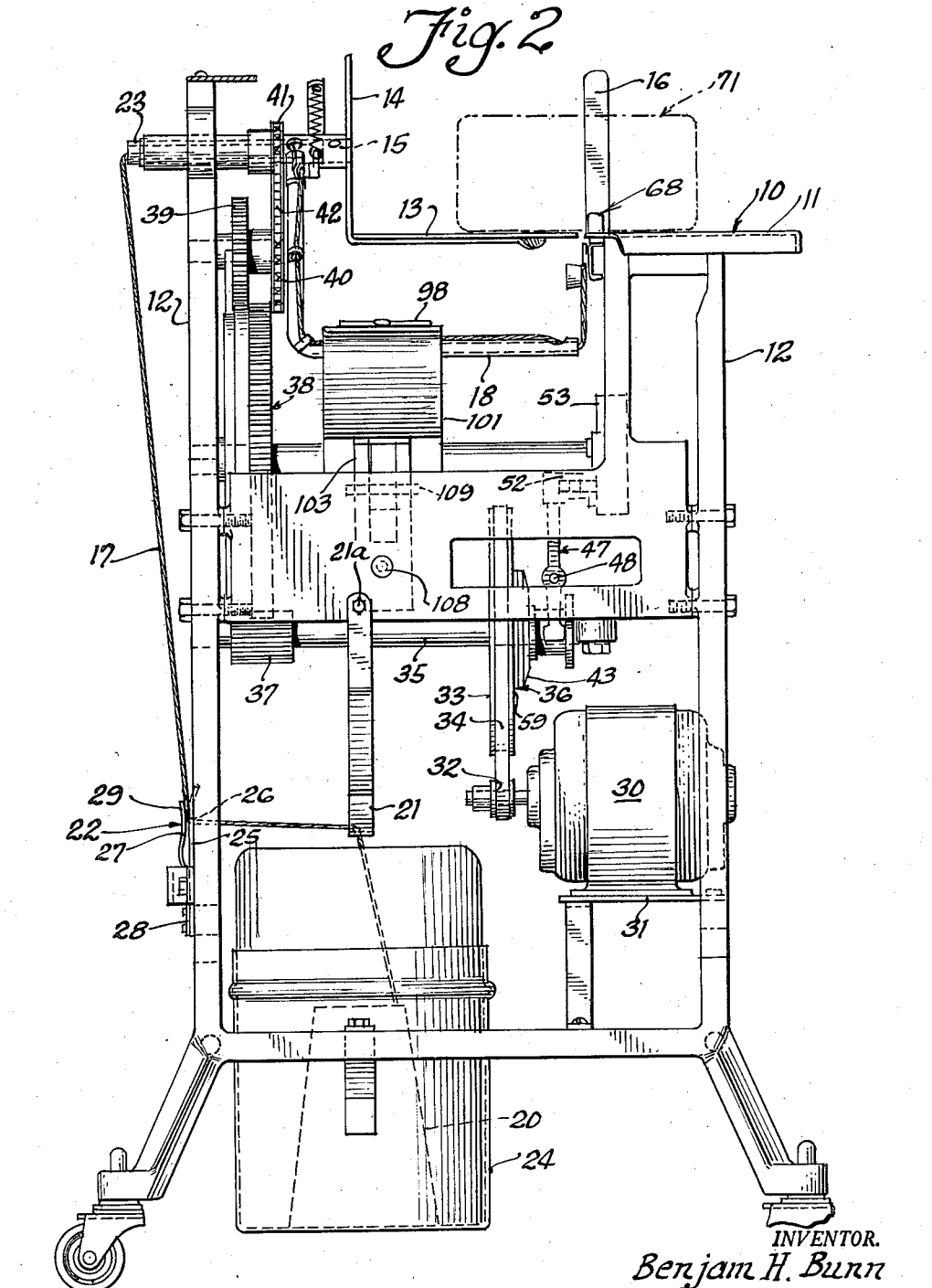
Fig. 2 is a side elevational view of the tying machine of Fig. 1 with a portion of a gear guard removed to show the gears used to drive the mechanism.

Referring now to Figs. 1 and 2 for a general description of a tying machine, to which the present improvements may be applied, it may be observed that the machine has a horizontal table 10 which is made in two sections, one section 11 being stationary and fixed to a frame 12, and the other section 13 being movably suspended by a plate 14 which, in turn, is mounted for swinging movement on a pin 15 (Fig. 2), which pin is supported for rotational movement from the frame 12. Secured to stationary section 11 of the table is an upright guide 16 which serves to assist in locating a package 71 on table 10 and to provide an abutment against which the package may be held during the twine wrapping and tying operations.

The twine with which the package 71 is wrapped is shown at 17, and is threaded through a twine arm 18, which twine arm is supported for rotational movement in a vertical plane so that the free end of the arm passes around the table section 13 to pass a reach of twine around said package 71. One end of said twine 17 is then tied and knotted to the other end of the wrapped twine by a knotting mechanism shown generally at 19. The knotting mechanism utilized in this machine may be substantially identical to that shown in my aforementioned Patent No. 1,606,290 and hence reference may be made to that patent for a more complete description of this mechanism.

Figure 3:
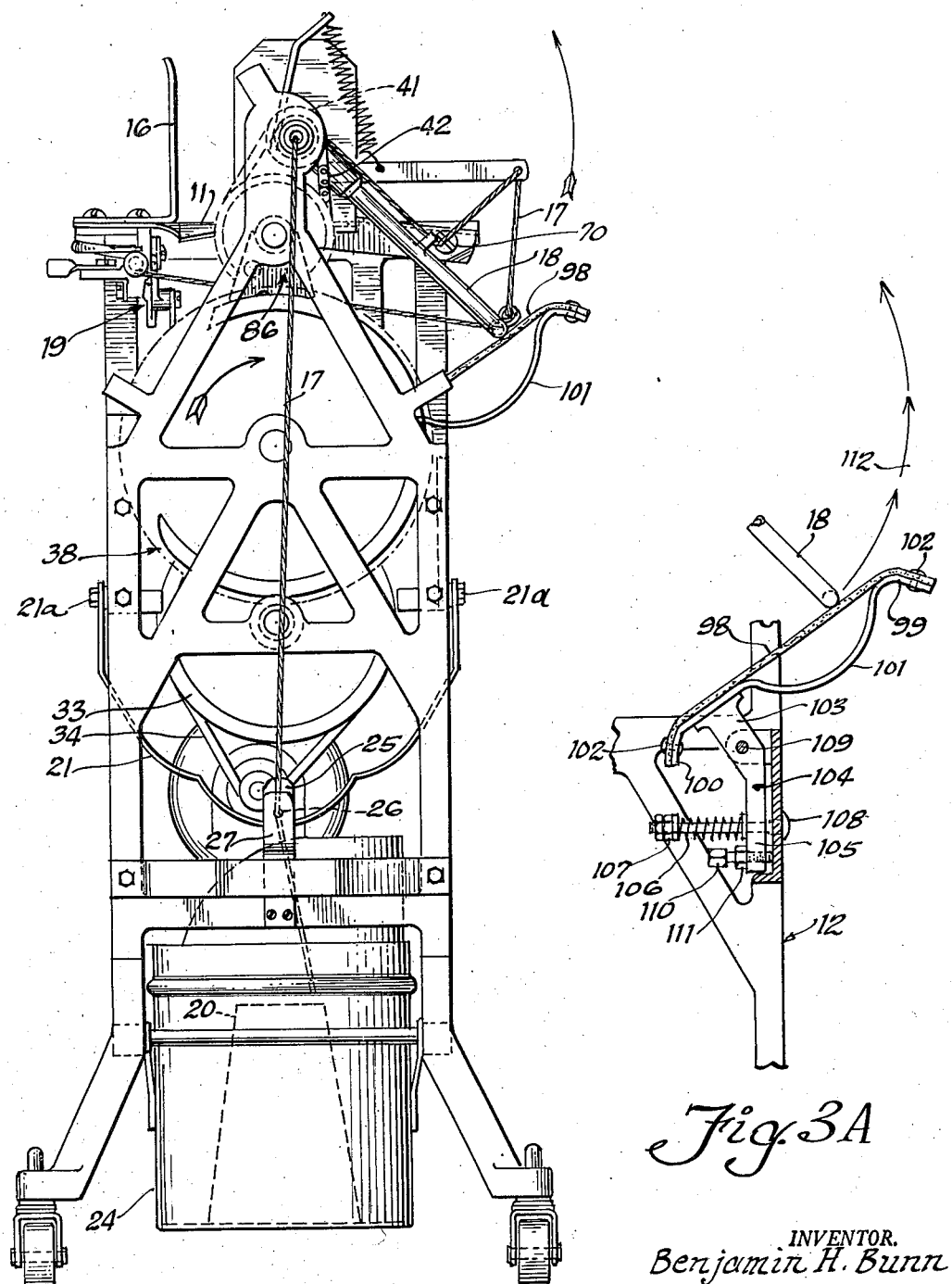
Fig. 3 is a rear elevational view of the tying machine.
Figure 4:
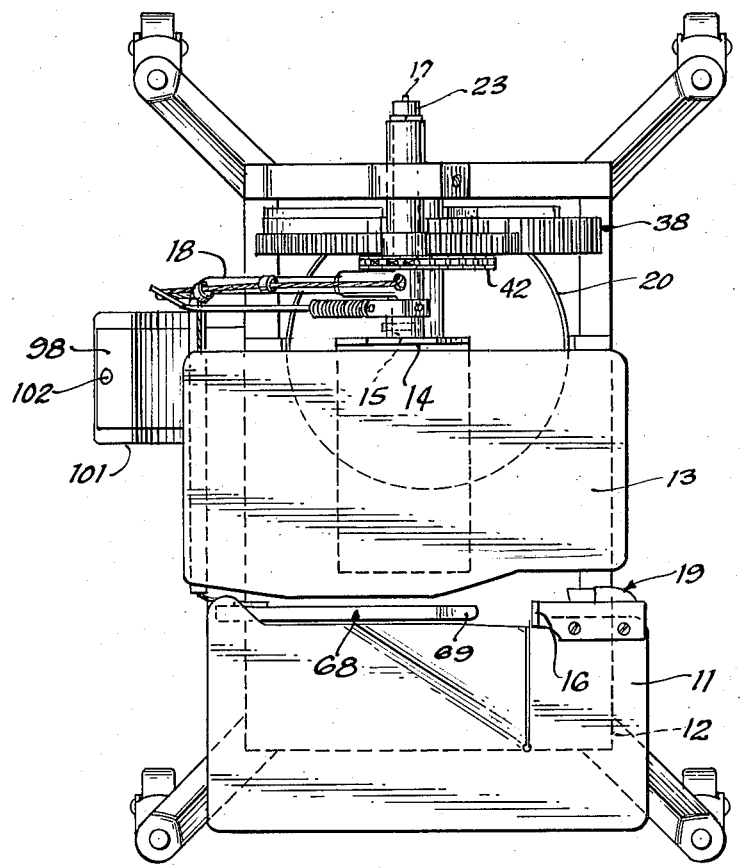
Fig. 4 is a top plan view of the machine.

The twine 17 is drawn from a cone 20 and extends through a guide 21 located above the spool, a tensioning guide 22, and to the center of a shaft 23 which is coaxial to the pin 15, upon which the twine arm 18 is mounted. The cone of twine 20 is preferably held loosely in a receptacle 24 mounted on frame 12. Guide 21 is mounted on a pivot screw 21a, about which it may be swung to move it out of the way when a new cone of twine is placed in receptacle 21. As shown in Fig. 2, the twine 17 extends in a straight line between the left hand end of shaft 23 and tensioning guide 22. Said tensioning guide 22 embodies a plate 25 secured to the frame 12 so as to be substantially parallel with one side thereof, such plate 25 having an opening 26 therein through which the twine 17 may pass, as shown in Figs. 2 and 3. The tension in the reach of twine 17 extending to the twine arm 18 is provided by a leaf spring 27 which is secured at one end 28 to frame 12 and the other end 29 of which is shaped to present a convex surface to the twine 17. The convexly curved end 29 of the leaf spring 27 is so located as to contact twine 17 at a substantial distance above the opening 26, as viewed in Figs. 2 and 3.

It may be observed that the tensioning guide 22 is of such nature that if the twine is of an uneven thickness, or in any way becomes bunched or twisted as it passes through opening 26, leaf spring 27 will yield and allow the uneven section of twine to pass between itself and plate 25. In the past, due to the fact that plate 25 and leaf spring 27 were disposed at an angle with respect to the line formed by twine 17 between opening 26 and the end of shaft 23, and also due to the fact that the point of contact of leaf spring 27 with twine 17 was substantially above opening 26, any unevenness in the twine as it passed through opening 26 tended to move the twine sideways out of contact with leaf spring 27 and the twine thereafter continued out of contact with leaf spring 27 until manually re-inserted. This, of course, removed the tension from the twine and interfered with the wrapping and tying operations. By causing the contact of leaf spring 27 with twine 17 to occur substantially at or very slightly above opening 26, this tendency to escape sideways from the pressure of leaf spring 27 is substantially eliminated, because the tension in twine 17 is substantially in a line passing through this point of contact.

Rotation of the twine arm 18 is effected by a drive mechanism originating at an electric motor 30 which is mounted on a bracket 31 supported from frame 12. Said motor 30 drives a pulley 32 which, in turn, drives a substantially larger pulley 33 through a belt 34. The pulley 33 is mounted for rotation relative to a shaft 35, but is adapted to be connected to drive said shaft 35 through a friction clutch 36, which clutch includes driving and driven friction plates 59 and 43, respectively, as depicted in Figs. 6 and 7. The shaft 35 drives a broad gear 37 which, in turn, is meshed with a mutilated gear 38 having interrupted teeth for engagement with a gear 39; the gear 39 being directly connected to a sprocket 40 which, through a chain 42, drives a smaller sprocket 41 secured to the shaft 23.

Thus, when the clutch 36 is engaged, motor 30 will drive the broad gear 37 through pulleys 32 and 33 and the belt 34, and broad gear 37 will drive the mutilated gear 38 which, in turn, drives gear 39 to rotate sprocket 40, and through chain 42, sprocket 41 is driven in timed relationship with sprocket 40, thereby rotating shaft 23 and the twine arm 18 which is secured to the shaft 23, as described.

The details of the clutch-operating mechanism are shown more clearly in Figs. 5 to 8, inclusive, to which figures reference is now made. Plate 43 of the clutch 36 is linearly movable toward and from the coacting clutch plate 59, and the movements thereof are controlled, in part, through an attached collar 44 which is grooved at 45 to receive the forked end 46 of a clutch operating lever 47. The lever 47 is pivoted for swinging movement by a pin 48 carried by a bracket 49 which is secured to the frame 12. An opposite end 50 of the clutch lever 47 has a roller 51 rotatably secured thereto, and a forked guide 52 which extends therefrom adjacent the roller. As shown in Fig. 5, roller 51 rotates about an axis which is at right angles to the axis of shaft 35 and is disposed in proximity to a rotatable face cam 53 mounted on a secondary shaft 54 and associated with the control mechanism for the machine. The secondary shaft 54 is driven in timed relationship to the mutilated gear 38, and hence is rotated in timed relationship to the movement of twine arm 18.

The clutch operating mechanism used in connection with the present invention is of such character that it is manually actuated for initiating the operation and automatically released when a predetermined cycle of operations of the machine is completed. The movement of the clutch release lever 47 at the roller 51 is relatively small and is represented by the solid and dotted line positions of the roller shown in Fig. 7. The solid line position is that which corresponds to the released condition of the clutch, and the dotted line position 55 corresponds to the engaged condition of the clutch 36.

The movement of roller 51 between the two positions shown in Fig. 7 is effected by the cooperation of a slip link 56, a cam follower 57, a cam block 58 on the face cam 53. When the slip link 56 is interposed between the cam follower 57 and roller 51, as shown in solid lines in Fig. 7, the clutch 36 will be disengaged when cam block 58 contacts cam follower 57, and will be engaged during the time that cam block 58 is not in contact with cam follower 57. To engage clutch 36, when slip link 56, cam follower 57 and cam block 58 assume the position shown in Fig. 7, it is necessary to slide slip link 56 to the right as viewed in Fig. 7 until it is free of roller 51, the latter thereupon being free to move to its dotted position 55. The movement of roller 51 to its dotted position will be effected by a spring (not shown) which normally biases the movable driven clutch plate 43 to its engaged position with the driving clutch plate 59 on pulley 33. With slip link 56 moved to the right, as shown in Fig. 8, follower 57 may be moved toward roller 51 by cam block 58 without exerting any pressure on said roller 51, and hence the cam block 58 may move past follower 57 without disengaging the clutch 36. As long as slip link 56 is held in its right-hand position (Figs. 7 and 8), the machine will continue to operate and repeat its cycle of operations indefinitely. When it is desired to stop the machine, slip link 56 is moved to the left, as viewed in Fig. 7, so that when cam block 58 next moves into contact with follower 57, the rise of cam block 58 will be transmitted through the cam follower 57 and the slip link 56 to roller 51, thereby moving said roller 51 to its clutch releasing position. Immediately upon roller 51 reaching its clutch releasing position, the driving connection to face cam 53 is interrupted and cam block 58 will remain in substantially the position shown in Fig. 7.

It is contemplated that the slip link 56 and the cam follower 57 will have considerable play or freedom of movement toward or away from the roller 51, and accordingly, the opposite or supported end 60 of the cam follower 57 is loosely mounted on a pin 61 which is secured to the frame 12, and the opposite or supported end 62 of slip link 56 is loosely mounted on a pin 63 secured to a bell crank 64 (Fig. 5), which bell crank is pivoted to frame 12.

In the form shown in Fig. 5, the bell crank 64 is provided with an arm 65 which is normally disposed in a substantially horizontal position with its free end pivotally connected to a vertically extending rod 66. The rod 66 passes through a guide opening 67 in the frame 12 and terminates beneath a trip lever 68, the free end 69 of which extends above the surface of table 10. Lever 68 is pivoted at 70 to frame 12 and is disposed between the stationary and movable sections 11 and 13 of the table 10, with clearance from the movable section 13. In this location, the free end 69 of the trip lever will be contacted by a package 71 which is placed in position to be wrapped, and the forces required for the operation of lever 68 and its associated mechanism may either be such that the normal weight of some packages will be sufficient to depress the free end 69 of lever 68 to the general level of table 10, but generally it is desirable that the operating force for the trip lever shall require some force to be applied against the package by the operator. This, for example, in the tying of bundles of mail or the like, has a tendency to squeeze air out of the bundle or its elements, thereby to make a more compact package, as tied. Depression of lever 69 causes bell crank 64 to be rotated counterclockwise, as viewed in Fig. 5, to move slip link 56 to the right and cause engagement of clutch 36, as has been described. A spring 72 continuously urges bell crank 64 in a clockwise direction to oppose the depression of the trip lever 68, so that upon release of the pressure against the package or the removal of package 71 from table 10, slip link 56 will return to its normal position between cam follower 57 and roller 51.

In the event that sufficient force is maintained against the trip lever 68 to hold it in a depressed position after the tying cycle is completed, slip link 56 will remain in the position shown in Fig. 8. In this position, as may be observed, the roller 51 is free to assume the position corresponding to an engaged position of the clutch 36. This engaged position is not disturbed by the passage of cam block 58 past cam follower 57, inasmuch as ample room is provided between follower 57 and roller 51 for follower 57 to move in response to its contact with the block 58 without causing the roller 51 to move to its released position, and without causing slip link 56 to contact said roller 51. Thus, with a package 71 left on table 10 beyond the end of the tying cycle, the machine will continuously repeat the tying cycle and will cause additional reaches of twine to be wrapped and tied around a package until the trip lever is released. This feature may provide an indication to a supervisor that an operator of a machine is not removing packages 71 from the machine as rapidly as he should. It will also have the effect of compelling an operator to watch the machine closely and to regulate the speed of his movements in accordance with the operation of the machine.

As an alternative to the trip mechanism disclosed in Figs. 5 to 8 inclusive, there is shown in Figs. 9 and 10 a mechanism which will not automatically repeat a tying cycle as long as the trip lever is depressed. In the latter form, only one tying cycle will be completed each time the trip mechanism is operated, and no additional ties will be made, even though the mechanism remains in its operated condition with the trip lever held down.

Referring now to Figs. 9 and 10, it may be observed that a bell crank 64a is provided with a roller 73 at the free end of an arm 65a and that the vertically extending rod 66 of the type shown in Fig. 5 has been replaced by a floating link 74 operating in openings 75 and 76 in the frame 12. Opening 75 extends through table 10, or through a portion of frame 12 adjacent thereto, and opening 76 is provided in a plate 77 secured to frame 12 by a bolt 78. A spring 79 normally urges the floating link 74 upwardly into contact with the under surface of the trip lever 68.

One side of the floating link 74 is cut away to form a cam surface 80, and a set screw 81 mounted in frame 12 is disposed and aligned to bear upon cam surface 80 when the floating link is moved downwardly. A tension spring 82 is hooked to the lower end of floating link 74 and to an angularly shaped spring holder 83 which, in the disclosed structure, is secured to frame 12 by the same bolt 78 which holds plate 77 in place on the frame. It may be observed that the opening 76 in plate 77 is considerably wider than the width of link 74 at that point, so that link 74 is free to move sideways in opening 76, as viewed in Figs. 9 and 10, under the action of the spring 82 and of any force opposed thereto.

The lower end of floating link 74 is offset and provided with a flat end surface 85 which normally engages roller 73 when trip lever 68 is in its elevated position, as shown in Fig. 9. Cam surface 80 is shaped to permit such contact between surface 85 and roller 73 when the trip lever is free and in its elevated position. When the trip lever 68 is depressed, as by placing a package to be tied upon table 10 at a position overlying the lever, a portion of the downward movement imparted to floating link 74 is transmitted to roller 73 to rotate bell crank 64a in a counterclockwise direction and effect driving engagement of the clutch 36, as previously described. During the remainder of the movement of floating link 74 in a downward direction, however, that link has a lateral movement to the right imparted thereto, as viewed in Fig. 9, by the action of cam surface 80 upon set screw 81, so that at the bottom of the stroke, that is, when the package is firmly resting on table 10, floating link 74 is cammed off of roller 73 and assumes a position such as that shown in Fig. 10. In this position, roller 73 is free to move upward and spring 72, operating continuously upon bell crank 64, will immediately effect this upward movement and its associated clockwise rotation of bell crank 64 to re-insert slip link 56 between roller 51 of clutch 36 and follower 57. With slip link 56 thus re-inserted, the clutch 36 will be released when the cam block 58 strikes the follower 57 and moves that follower 57, slip link 56, and roller 51 downwardly, as viewed in Fig. 7. Clutch 36 will thus be disengaged and will remain in disengaged condition while trip lever 68 is either held down or allowed to raise to the position shown in Fig. 9, whereupon the end of floating link 74 may engage roller 73 to condition the mechanism for a repetition of the cycle.

The trip mechanism shown in Figs. 9 and 10 does not require such close attention by an operator of the tying machine as does the mechanism of Figs. 5 to 8 inclusive. The former may be utilized where the machine is to be used intermittently, that is, where the number of packages or the frequency of use of the machine is not very great.

One of the necessary functions performed by parts of a machine of the type herein described is that of arresting the movement of the twine arm while the knotting function is being performed. This is accomplished partly through the use of the mutilated gear 38 which ceases to drive the twine arm while the knotting function is being performed. The twine arm must be put into motion from a predetermined position by the mutilated gear, however, upon the initiation of each cycle of operation and this means that the first tooth in the series of the mutilated gear provided for the rotation of the twine arm must accelerate the twine arm from zero r.p.m. to maximum r.p.m. in a fraction of a second. To insure the ability of the mutilated gear and of the twine arm gear to withstand such severe acceleration, the first tooth of the mutilated gear and the first tooth to be contacted on the twin arm gear are made of double thickness. To make certain that these two teeth of extra thickness always engage rather than some other teeth, the twine arm must not only be arrested, but must be arrested at a particular angular relation with respect to the frame. As shown in my prior Patent No. 2,451,-197, this arresting function is accomplished by securing a shoe to the twine arm gear 39, which shoe engages a cylindrical surface on mutilated gear 38 to prevent rotation of the twine arm gear relative to said mutilated gear (and to said frame) after the mutilated gear ceases to drive the twine arm gear.

In the present design, as shown in the accompanying drawings, a shoe 86 is likewise utilized for this purpose, but in order to enable the manufacturer to use less close tolerances in the manufacture of the shoe and mutilated gear, the shoe is pivotally mounted so that it can adjust itself to the contour of the cylindrical surface of the mutilated gear despite minor variations in dimensions of the shoe or mutilated gear.

Referring specifically to Fig. 11, there is shown the mutilated gear 38, the twine arm driving gear 39 driven by the mutilated gear and constituting the drive for the twine arm, and a shoe 86 mounted on the side of gear 39 through a pin 87 about which shoe 86 is free to turn. Such shoe 86 has a concave surface 88 which is adapted to ride on a cylindrical surface 89 disposed on the side of gear 38 adjacent teeth 90 which drive gear 39. A first tooth 91 of teeth 90 is a double tooth, and it is adapted to engage a double tooth 92 on gear 39. The tooth on gear 39 normally preceding tooth 92 is removed to leave a double space into which tooth 91 may enter. As stated above, it is imperative that gear 39, when not driven by mutilated gear 38, assumes an angular relationship with respect to said gear 38 and frame 12 which is such that tooth 92 on said gear 39 will be the first to be contacted by tooth 91 on gear 38 when rotation of twine arm 18 is to be initiated. It is the function of shoe 86 to maintain and insure that desired angular relationship by causing concave surface 88 of said shoe 86 to ride on cylindrical surface 89 of gear 38 and thereby to prevent rotation of said gear 39.

It is difficult, however, to construct shoe 86 and mount it on gear 39 with such accuracy that surface 88, and not just the outer or leading edges of this surface, will contact surface 89. It is desirable, of course, to maintain surface-to-surface contact rather than a line contact between shoe 86 and surface 89 to avoid gouging surface 89. By mounting shoe 86 on a pivoted connection such as pin 87, such shoe 86 can adjust itself to the curvature of surface 89 so that a true surface-to-surface contact is always obtained.

Rotation of shoe 86 about pin 87 is limited in both directions by extensions 93 and 94 on shoe 86, one disposed on one side of a hub 95 on gear 39 and the other disposed on the other side of said hub. Thus, rotation clockwise about pin 87 is limited by extension 94, and rotation counterclockwise is limited by extension 93. A certain amount of clearance is provided between these extensions and hub 95 to permit a limited amount of rotation in either direction about said pin 87.

The manner in which shoe 86 operates is shown in Figs. 12 to 17 inclusive. As depicted in Fig. 12, mutilated gear 38 has a short travel remaining for the completion of the knotting cycle. In this position, gear 39 is held against rotation by the engagement of shoe 86 against surface 89 on the mutilated gear and twine arm 18 is held in its rest position. In Fig. 13 the mutilated gear 38 has advanced to a position in which the double teeth 91 and 92 are engaged, and the rotation of twine arm 18 is about to commence. In Fig. 14, rotation of twine arm 18 through a relatively small angle has been effected, and shoe 86 has left surface 89 except for the corner which engages a notch 96 in surface 88 of shoe 86 provided for that purpose. The weight of shoe 86 and the lack of support provided by surfaces 88 and 89 cause shoe 86 to rotate about pivot 87 until extension 93 strikes hub 95. This represents the limit of the movement of shoe 86 in a clockwise direction, as viewed in Fig. 14. In the position illustrated in Fig. 15, shoe 86 has left surface 89 completely and is now subject only to centrifugal force as twine arm 18 continues its rotation. In the position of Fig. 16, twine arm 18 has travelled about 270 degrees, is approximately 90 degrees away from its starting position, and shoe 86 is beginning to strike an opposite shoe engaging end 97 of the cam surface 89. No resistance to the further movement of arm 18 is yet provided by shoe 86. As shown in Fig. 17, twine arm 18 has almost completed its rotation and shoe 86 has almost contacted surface 89. When the end of the movement of the twine arm 18 is reached, as shown in Fig. 12, full surface-to-surface contact is effected between surfaces 88 and 89, and hence the inertia forces developed in the arm and associated rotating mechanism are distributed over a relatively wide area, thereby preventing gouging of surface 89. The free pivoting movement of shoe 86 about pin 87 permits a perfect adjustment of surfaces 88 and 89 to effect this broad surface-to-surface contact with parts made to production tolerances.

Such commercial tolerances are used in the manufacture of the herein disclosed machine that there is naturally a certain amount of play between twine arm 18 and shoe 86, coupled with some resilience both in the arm and in the connecting mechanism. Thus, when arm 18 reaches the position shown in Fig. 12, it will tend to over-travel until all play in that direction is taken up, whereupon the resilience in the system will cause the arm to spring back sufficiently to take up all play in the opposite direction and it will then be again reversed by the resilience in the system so that a certain amount of chatter of diminishing amplitude may take place in arm 18 at the point where it is to be held against rotation. This chatter is completely damped by a friction brake mechanism which is shown more clearly in Figs. 3 and 3A. A friction brake mechanism for a similar purpose is shown in my prior Patent No. 2,451,197, but in such prior construction the brake is so disposed relative to the rest position of arm 18, that it still exerts a certain amount of holding force on said arm 18 when it reaches its rest position. This holding force must be overcome by the drive mechanism for the arm, principally by teeth 91 and 92, which further increases the shock load imposed and these teeth and associated elements.

The brake, as presently constructed, and as illustrated in Figs. 3 and 3A, is so disposed that the braking effort on arm 18 is completely removed at the rest position of said arm so that no increase in load is imposed upon the drive mechanism for the arm when its rotation is to be initiated.

Referring specifically to Fig. 3A, the brake for arm 18 embodies a leather strap 98 which is stretched between the ends 99 and 100 of a spring 101 to which it is secured by rivets 102. Said spring 101 is preferably made of flat spring steel which is bowed as shown. Spring 101 is secured to one arm 103 of a lever 104 by welding or the like, and another arm 105 of lever 104 is urged toward frame 12 by a spring 106 which is compressed between a nut 107 on a bolt 108 and said other arm 105. Bolt 108 is anchored to frame 12 as shown. The compression of spring 106 can be adjusted by advancing nut 107 on bolt 108.

Lever 104 is pivoted at 109 to frame 12, and its angular position relative to said frame can be adjusted by a set screw 110, the setting of which may be fixed by a lock nut 111. The circle described by the end of the twine arm 18 is indicated at 112, and the strap 98 describes a chord as it intersects circle 112. It may be observed that when arm 18 is in the position shown in Fig. 3A, which is in its normal rest position, or the position from which a tying cycle is initiated, its end is located at the intersection of the chord formed by strap 98 and the circle 112 described by the said end of arm 18, so that further rotation of the twine arm 18 in a counter-clockwise direction, as shown in Fig. 3A, is in a direction away from strap 98. Hence, there is no resistance provided by the present form of the brake to the initiation of motion of the twine arm for a cycle of operation.

Set screw 110 determines the length and disposition of the chord of circle 112 formed by strap 98 and spring 106 determines the amount of braking force applied to the twine arm by strap 98. In this way complete control of the twine arm 18 may be had, so that it may be accelerated quickly and smoothly and then brought to rest without vibration or chattering, and then held so as to be free of any substantial resistance to the resumption of its rotation when a new cycle is begun.

Although strap 98 has been described as being made of leather, it may be made of any other material commonly used for friction brakes.

It is understood that the foregoing description is merely illustrative of preferred froms of the invention and that the scope of the invention should not be limited thereto, but is to be determined by the appended claims.

I claim:
1. A tying machine assembly comprising a table on which an article to be tied is placed, a source of twine, power operated means for performing a cycle of operations upon the twine and article to wrap the twine about the article and tie the wrapped twine in a knot, and a trip mechanism for initiating the cycle of operations, said mechanism including an oscillatable rod connected to the power operated means, a bell crank having one arm pivotally connected to the rod, a second oscillatable rod, a manually controlled lever, means for locating the second oscillatable rod to engage the manually controlled lever and the second arm of the bell crank so that operation of the lever causes operation of the bell crank and the first-mentioned oscillatable rod to initiate the cycle of operation, as aforesaid, and means for automatically disengaging the second oscillatable rod from the bell crank after the cycle has been initiated and while said manually controlled lever is operated to prevent a repetition of the cycle until the manually controlled lever is released.

2. A tying machine assembly as described in claim 1, said last-mentioned means comprising a cam and follower operated by the said second oscillatable rod during its oscillating movement.

3. A typing machine assembly as described in claim 1, said last-mentioned means comprising a cam formed in the said second oscillatable rod, a fixed follower and resilient means for holding the cam against the follower.

4. A tying machine assembly as described in claim 1, a roller on the end of the second arm of the bell crank, said roller being adapted to contact the end of the said second oscillatable rod during the first part of the operative movement of the second oscillatable rod and to permit sliding of the end of said rod off the second arm of the bell crank to disconnect the said rod from the bell crank as aforesaid.

5. A tying machine assembly comprising a table on which an article to be tied is placed, said table having an opening in a region thereof over which said article is to be placed, power operated means for wrapping a reach of twine about said article and for tying a knot in the wrapped twine, a lever extending into the opening, a trip mechanism for initiating the operation of the power operated means, said trip mechanism including an oscillatable rod adapted to be engaged at its other end by the remainder of the trip mechanism to transmit the motion of the lever to the remainder of the trip mechanism, and means operated over a portion of the movement of the oscillatable rod to disengage said rod from the remainder of the trip mechanism, whereby to prevent repetition of the wrapping and tying cycle while the lever holds the rod over that portion of the movement of the rod wherein said rod is disconnected from the remainder of the mechanism as aforesaid.

6. A tying machine assembly comprising a table on which an article to be tied is placed, said table having an opening in a region of said table over which said article is to be placed, power operated means for wrapping a reach of twine about said article and for tying a knot in the wrapped twine, means in the opening and movable in response to the movement of an article as said article is placed over the opening to initiate the operation of said power operated means, and means for disabling the power operated means after the article is tied and while the article is contacted by the operation initiating means, said disabling means including a portion of the operation initiating means.

7. A tying machine assembly as described in claim 6, said disabling means comprising a clutch, a lever for controlling the operation of the clutch, a cam operated in timed relation with the operation of the assembly, a follower interposed between the cam and clutch lever, and a slip link interposed between the follower and clutch lever and adapted to transmit the motion of the follower to the clutch lever to control the operation of the clutch, said portion of the operation initiating means being connected to the slip link, said slip link being removable from between the follower and clutch lever to prevent the transmission of the motion of the follower to the clutch lever as long as an article is placed over said opening in the table.

8. A tying machine assembly comprising a fixed table having a substantially plane surface on which an article to be tied is placed, a second table adjacent the first table and having a surface which is substantially coplanar with the surface of the fixed table, a swinging support for the second table, said tables having their adjacent sides spaced from one another, power operated means for passing a reach of twine through the space between the tables and around the article to be tied, an abutment extending upwardly from the fixed table surface and against which the article to be tied may be held during the tying operation, means for initiating the operation of the power operated means, a lever having an end extending in one position above the surface of the fixed table and in another position coplanarly therewith, means connecting the lever to the means for initiating the operation of the power operated means, such that when an article to be tied is placed upon the table and lever, the operation of the power operated means will be automatically initiated and means for disabling the connecting means after a tying operation but while the article is upon the lever.

References Cited in the file of this patent

UNITED STATES PATENTS

| | | |
|---|---|---|
| 181,052 | Gray | Aug. 15, 1876 |
| 1,402,617 | Jordan | Jan. 3, 1922 |
| 1,405,058 | Moore | Jan. 31, 1922 |
| 1,597,697 | Saxton et al. | Aug. 31, 1926 |
| 1,606,290 | Bunn | Nov. 9, 1926 |
| 1,845,476 | Blohm | Feb. 16, 1932 |
| 1,994,453 | Bunn | Mar. 19, 1935 |
| 2,346,786 | Radeck | Apr. 18, 1944 |
| 2,363,391 | Bunn | Nov. 21, 1944 |
| 2,469,544 | Bunn | May 10, 1949 |
| 2,559,619 | Henderson | July 10, 1951 |

UNITED STATES PATENT OFFICE
CERTIFICATE OF CORRECTION

Patent No. 2,898,847                                             August 11, 1959

Benjamin H. Bunn

It is hereby certified that error appears in the printed specification of the above numbered patent requiring correction and that the said Letters Patent should read as corrected below.

Column 8, line 23, for "imposed and" read -- imposed on --; column 9, line 23, for "typing" read -- tying --; line 43, after the word "engaged" insert -- at one end by said lever and --.

Signed and sealed this 9th day of February 1960.

(SEAL)
Attest:

KARL H. AXLINE
Attesting Officer

ROBERT C. WATSON
Commissioner of Patents